US008645571B2

(12) United States Patent
Downton et al.

(10) Patent No.: US 8,645,571 B2
(45) Date of Patent: Feb. 4, 2014

(54) SYSTEM AND METHOD FOR MANAGING AND/OR USING DATA FOR TOOLS IN A WELLBORE

(75) Inventors: Geoff Downton, Minchinhampton (GB); Clinton D. Chapman, Missouri City, TX (US); Shyam B. Mehta, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 693 days.

(21) Appl. No.: 12/535,793

(22) Filed: Aug. 5, 2009

(65) Prior Publication Data

US 2011/0031015 A1 Feb. 10, 2011

(51) Int. Cl.
*G06F 15/16* (2006.01)

(52) U.S. Cl.
USPC .......... 709/246; 709/249; 709/230; 340/853.3

(58) Field of Classification Search
None
See application file for complete search history.

(56) References Cited

U.S. PATENT DOCUMENTS

| | | | | |
|---|---|---|---|---|
| 5,331,318 | A * | 7/1994 | Montgomery | 340/855.4 |
| 5,959,547 | A * | 9/1999 | Tubel et al. | 340/853.2 |
| 6,305,944 | B1 | 10/2001 | Henry et al. | |
| 6,641,434 | B2 | 11/2003 | Boyle et al. | |
| 6,980,929 | B2 * | 12/2005 | Aronstam et al. | 702/188 |
| 7,064,676 | B2 * | 6/2006 | Hall et al. | 340/853.1 |
| 7,098,802 | B2 * | 8/2006 | Hall et al. | 340/854.3 |
| 7,145,472 | B2 * | 12/2006 | Lilly et al. | 340/853.3 |
| 7,224,288 | B2 * | 5/2007 | Hall et al. | 340/853.7 |
| 7,230,541 | B2 * | 6/2007 | Ripolone et al. | 340/853.2 |
| 7,999,695 | B2 * | 8/2011 | Rodney et al. | 340/855.5 |
| 8,164,980 | B2 * | 4/2012 | Sullivan et al. | 367/82 |
| 8,242,928 | B2 * | 8/2012 | Prammer | 340/853.7 |
| 8,284,075 | B2 * | 10/2012 | Fincher et al. | 340/854.4 |
| 8,312,320 | B2 * | 11/2012 | Almadi et al. | 714/15 |
| 8,417,495 | B2 * | 4/2013 | Dashevskiy | 703/7 |
| 2003/0098799 | A1 | 5/2003 | Zimmerman | |
| 2004/0051650 | A1 * | 3/2004 | Gonsoulin et al. | 340/853.1 |
| 2004/0262008 | A1 | 12/2004 | Deans et al. | |

(Continued)

FOREIGN PATENT DOCUMENTS

| | | |
|---|---|---|
| GB | 24448044 A | 10/2008 |
| WO | 2008020152 | 2/2008 |
| WO | 2010013004 | 2/2010 |

OTHER PUBLICATIONS

'High Speed Drill String Telemetry Network Enables New Real Time Drilling and Measurement Technologies', IADC/SPE Drilling Conference, Feb. 21-23, 2006, Authors M. Reeves, SPE, IntelliSery Inc., et al., Society of Petroleum Engineers , ISBN 978-155563-238-0, Document ID 99134-MS.*

(Continued)

*Primary Examiner* — Greg C Bengzon
(74) *Attorney, Agent, or Firm* — Kimberly Ballew (57) ABSTRACT

A system and a method manage and use data related to a wellbore or a drill string. The system and the method may provide remote access to tools in a drill string using a network. In addition, the tools have access to the data. In a disclosed embodiment, the tools are able to automatically access the data needed to optimize or improve function of the tools. An example of the network is a wireless network where the tools may be monitored and/or controlled remotely by an application. A linking tool is optionally provided to communicate with the network and one or more of the tools.

5 Claims, 4 Drawing Sheets

(56) References Cited

U.S. PATENT DOCUMENTS

| | | |
|---|---|---|
| 2005/0284659 A1* | 12/2005 | Hall et al. .................. 175/27 |
| 2006/0196664 A1 | 9/2006 | Hall et al. |
| 2008/0095165 A1 | 4/2008 | Johnson et al. |
| 2009/0034368 A1* | 2/2009 | Johnson ..................... 367/83 |
| 2009/0045973 A1* | 2/2009 | Rodney et al. ........... 340/853.2 |
| 2009/0135950 A1 | 5/2009 | Hoffmann et al. |
| 2009/0250225 A1* | 10/2009 | Zaeper et al. .............. 166/374 |
| 2009/0287966 A1 | 11/2009 | Keyghobad et al. |
| 2010/0067329 A1* | 3/2010 | Edwards et al. ............. 367/82 |
| 2010/0147511 A1 | 6/2010 | Ollre |
| 2011/0140907 A1* | 6/2011 | Louden ..................... 340/854.3 |
| 2011/0290559 A1* | 12/2011 | Rodney et al. .............. 175/24 |
| 2012/0080227 A1* | 4/2012 | Cardellini et al. ............ 175/40 |
| 2012/0274477 A1* | 11/2012 | Prammer .................. 340/853.7 |
| 2013/0213128 A1* | 8/2013 | Gleitman, Daniel D. .. 73/152.12 |

OTHER PUBLICATIONS

High-Speed Wired Drillstring Telemetry Network Delivers Increased Safety, Efficiency, Reliability, and Productivity to the Drilling Industry, by M. Hernandez et. al, SPE Indian Oil and Gas Technical Conference and Exhibition, Mar. 4-6, 2008, Society of Petroleum Engineers, ISBN 978-1-55563-192-5, Document ID 113157-MS.*

GB Exam Report to UK Patent Application No. GB1013073.0 dated Apr. 5, 2012.

UK Examination Report of Great Britain Application Serial No. GB1013073.0 dated Oct. 14, 2011.

* cited by examiner

SYSTEM AND METHOD FOR MANAGING AND/OR USING DATA FOR TOOLS IN A WELLBORE

BACKGROUND OF THE INVENTION

The present invention generally relates to a system and a method for managing and/or using data for tools in a wellbore. More specifically, the present invention provides one or more tools located downhole or at the surface with access to data and intelligence to perform actions based on the data. For example, one or more of the tools may utilize measurement data to adjust drilling operations, tool operations and/or the like without instructions from a surface location. As another example, one or more of the tools may connect to a network and/or a database to access information and to perform an action, such as, for example, to improve performance of the tool or improve performance of the drilling process. The tools may automatically perform diagnostics and report a status of the diagnostics to the network and/or the database without instructions from the network.

To obtain hydrocarbons, a drilling tool is driven into the ground surface to create a borehole through which the hydrocarbons are extracted. Typically, a drill string is suspended within the borehole. The drill string has a drill bit at a lower end of the drill string. The drill string extends from the surface to the drill bit. The drill string has a bottom hole assembly (BHA) located proximate to the drill bit.

Drilling operations may be conducted in a vertical, horizontal or directional orientation of the drill string. Vertical drilling refers to drilling in which the trajectory of the drill string is inclined approximately ten degrees or less. Horizontal drilling refers to drilling in which the drill string is approximately perpendicular to the ground surface. Directional drilling refers to drilling in which the trajectory of the drill string is inclined between ten degrees and ninety degrees. Directional drilling may be advantageous in that directional drilling may enable several wells to be drilled from one drilling platform.

Drilling operations typically require monitoring to determine the trajectory of the borehole. Measurements of drilling conditions, such as, for example, drift of the drill bit, inclination, azimuth and the like, may be necessary for determining the trajectory of the borehole, especially for directional drilling.

The BHA may have tools that may generate and/or may obtain information regarding the wellbore, a surrounding formation and the drilling conditions. Technology for transmitting information within a wellbore, known as telemetry technology, is used to transmit the information from the tools of the BHA to a surface location for analysis. The information may be used to control the tools. Accurate real-time information regarding the tools, the wellbore, the surrounding formation and the drilling conditions may enable prevention and/or detection of a drilling problem, such as, for example, a hazard region which the drilling tool must avoid, a blowout, casing wear and/or the like. Moreover, adjustment of the drilling operations in response to accurate real-time information may enable optimization of the drilling process to increase a rate of penetration of the drill bit, reduce a drilling time and/or optimize a placement of the wellbore.

Wired drill pipe, such as the wired drill pipe infrastructure described in U.S. Pat. No. 6,641,434, enables high-speed transmission of the information from the tools to the surface location. The wired drill pipe infrastructure may have communication cables embedded in the drill pipe for transmittal of the information. In addition, the communication cables may be connected to coupling devices located at each joint of the drill pipe to enable transmission of the information and transmission of fluid through the drill pipe. In an embodiment, a tubular sleeve may secure the communication cables and/or protect the communication lines from damage.

The high-speed transmission by the wired drill pipe may provide a data transmission rate that may be orders of magnitude greater then a data transmission rate of other telemetry technologies, such as, for example, mud pulse telemetry or electronic pulse telemetry. The high-speed transmission by the wired drill pipe may also provide data transmission from relatively distant drilling depths.

However, communication with downhole tools is generally limited to providing commands and receiving measurement information. In addition, downhole tools are limited in diagnostic control within the borehole. Typically, a problem associated with a downhole tool requires removing the tool from the wellbore prior to analyzing the tool for defects. As a result, considerable drilling time is lost in the event of a tool failure. Moreover, determination of whether the problem associated with the tool may cause failure of the tool is difficult, if not impossible. Frequently, an operator or other like individual does not determine that the tool has a problem until the tool completely fails or repeatedly fails. Accordingly, tools usually fail prior to any recognition of potential problems.

DETAILED DESCRIPTION OF THE PRESENTLY PREFERRED EMBODIMENTS

The present invention generally relates to a system and a method for managing and/or using data for tools in a wellbore. More specifically, the present invention provides one or more tools located downhole or at the surface with access to data and intelligence to perform actions based on the data. The tools may automatically perform diagnostics and report a status of the diagnostics to the network and/or the database without instructions from the network.

The system and the method may be used in oil well drilling to obtain, organize, display and/or analyze data regarding drilling conditions, wellbore conditions and/or tool operating conditions. The system and the method may utilize the data to adjust drilling operations, tool operations and/or the like without instructions from a surface location. The tools may be programmed and/or may be designed to prepare a report and/or determine whether to transmit the report. The tools may generate an updated model of drilling operations and a state of one or more of the tools and/or any component of an associated drill string. The tools may connect to a network so that the tools may be monitored and/or controlled by an application. The system and the method may provide an application and/or a linking tool that enable control of the tools and/or any component of the drill string.

Figure 1:
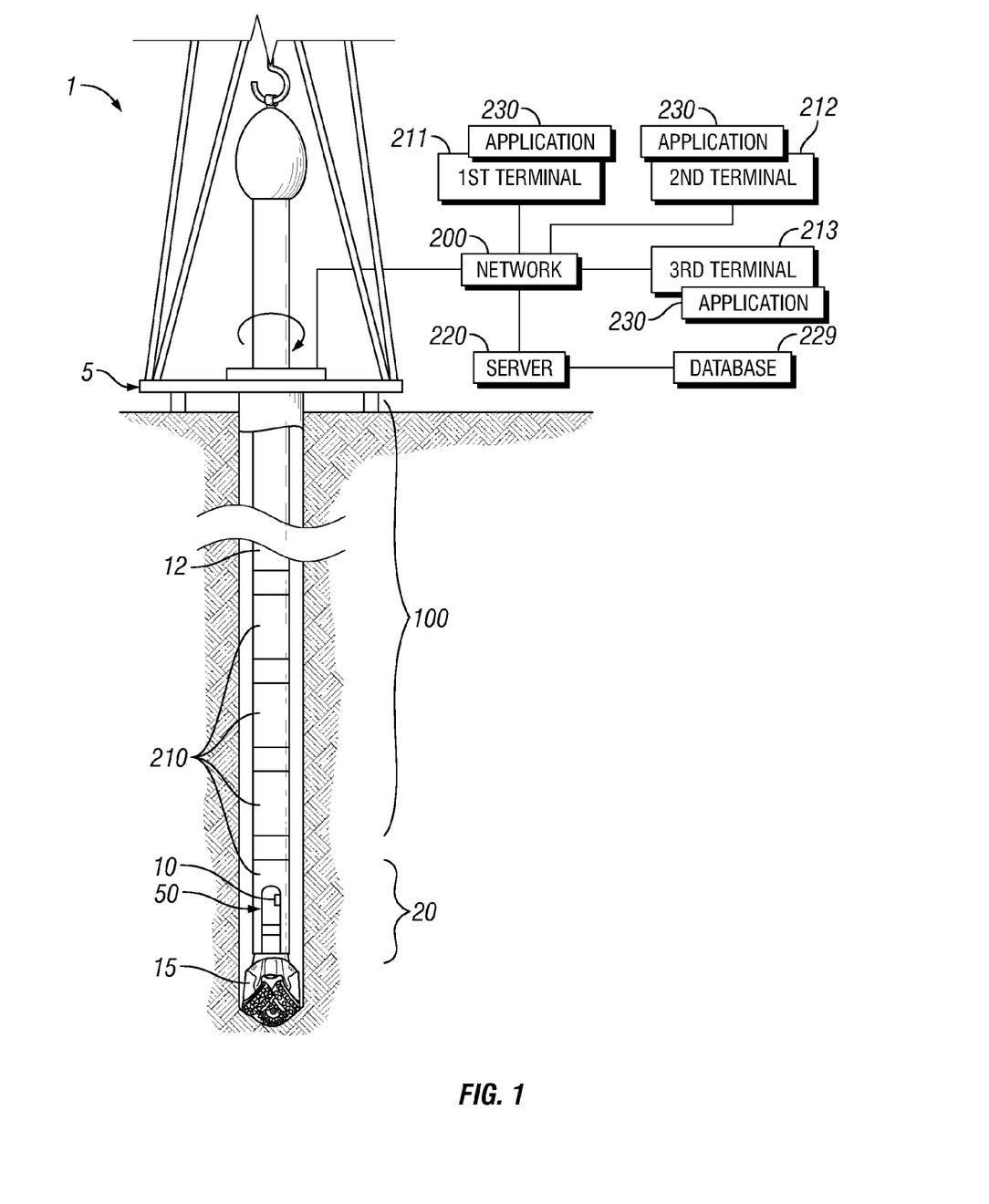
FIG. 1 illustrates a drill string in an embodiment of the present invention.

Referring now to the drawings wherein like numerals refer to like parts, FIG. 1 generally illustrates a wellbore system 1 in an embodiment of the present invention. A platform assembly 5 may be positioned over a borehole 11 that may penetrate a drilling surface. A drill string 12 may have a drill bit 15 and/or may be suspended within the borehole 11. The drill bit 15 may be rotated by imparting rotation on the drill string 12, and/or a motor or other device (not shown) may be provided within the drill string 12 to rotate the drill bit 15.

The drill string 12 may have a bottom hole assembly (BHA) 20 that may be located adjacent to the drill bit 15. The drill string 12 may have a telemetry system 100 that may be one or more known telemetry systems. For example, the telemetry system 100 may use electromagnetic telemetry, acoustic telemetry, mud pulse telemetry, wired drill pulse telemetry and/or a combination of these technologies. While the present invention may be discussed primarily with respect to a wired drill pipe telemetry system, the invention should not be deemed as limited to only the use of wired drill pipe. Any one or combination of these telemetry systems may be used. For example, the telemetry system 100 may consist of wired drill pipe that extends from the drilling surface to a position within the wellbore and a mud pulse telemetry system that extends from the position within the wellbore to the BHA 20. In the case of wired drill pipe, the telemetry system 100 may consist of one or more wired drill pipe (WDP) joints 210.

A tool 10 may be associated with the telemetry system 100, the BHA 20 and/or the drill string 12. In an embodiment, the tool 10 may be a steering mechanism 50 that may control a direction of drilling, the rotation of the drill string 12, an inclination of the borehole 11 and/or an azimuth of the borehole 11. For example, the steering mechanism 50 may be a rotary steerable system that may be one or more downhole devices that may cause the drill bit 15 to drill in a desired direction. The tool 10 may provide measurements regarding the borehole 11, a formation that may surround the borehole 11, the drill string 12 and/or any component of the drill string 12. For example, the tool 10 may be and/or may have a measurement-while-drilling ("MWD") tool, a logging-while-drilling ("LWD") tool, a strain measuring device, a torque measuring device, a temperature measuring device, a seismic tool, a resistivity tool, a direction measuring device, an inclination measuring device, a weight-on-bit measuring device, a vibration measuring device, a shock measuring device, a stick-slip measuring device, a drilling tool used to create the borehole 11 and/or the like. In an embodiment, the tool 10 may be a wireline configurable tool, such as a tool commonly conveyed by wireline cable as known to one having ordinary skill in the art. The present invention is not limited to a specific embodiment of the tool 10. FIG. 1 depicts the tool 10 in association with the BHA 20, but the present invention is not limited to a specific location of the tool 10 within the drill string 12.

The tool 10 may have capabilities for measuring, processing and/or storing information, as well as for communicating with a surface location. The tool 10 may have a sensor, such as, for example, a gauge, a temperature sensor, a pressure sensor, a flow rate measurement device, an oil/water/gas ratio measurement device, a scale detector, a vibration sensor, a sand detection sensor, a water detection sensor, a viscosity sensor, a density sensor, a bubble point sensor, a composition sensor, a resistivity array sensor, an acoustic sensor, a near infrared sensor, a gamma ray detector, a $H_2S$ detector, a $CO_2$ detector and/or the like.

An example of a communication apparatus that may be used in and/or with the telemetry system 100, the BHA 20 and/or the tool 10 is described in detail in U.S. Pat. No. 5,339,037. The present invention is not limited to a specific embodiment of the telemetry system 100, the communication apparatus or the BHA 20.

For example, the tool 10 may measure, may record and/or may transmit data acquired from and/or through the borehole 11 (hereinafter "the data"). The data may relate to the borehole 11 and/or the formation that may surround the borehole 11. For example, the data may relate to one or more characteristics of the formation and/or the borehole 11, such as, for example, a temperature, a pressure, a depth, a composition, a density and/or the like. The data may relate to one or more characteristics of the drill string 12, such as, for example, an amount of stretch, an amount of strain, an angle, a direction, a characteristic of fluid flowing through the drill string 12, a dog-leg severity and/or the like. For example, the data may indicate a trajectory of the borehole 11, a depth of the borehole 11, a width of the borehole 11 and/or the like. Further, the data may be and/or may indicate, for example, a location of the drill bit 15, an orientation of the drill bit 15, a weight applied to the drill bit 15, a rate of penetration, properties of an earth formation being drilled, properties of an earth formation and/or a hydrocarbon reservoir located proximate to the drill bit 15, fluid conditions, fluids collected and/or the like. Still further, the data may be, for example, resistivity measurements, neutron porosity measurements, azimuthal gamma ray measurements, density measurements, elemental capture spectroscopy measurements, neutron gamma density measurements that measure gamma rays generated from neutron formation interactions, sigma measurements and/or the like. The data may be and/or may indicate an inclination of the borehole 11 and/or an azimuth of the borehole 11, for example. The data may indicate annular pressure, three-axis shock and/or vibration, for example. The data may be measured and/or obtain at predetermined time intervals, at predetermined depths, at request by a user and/or the like. The present invention is not limited to a specific embodiment of the data. The data may be any data as known to one having ordinary skill in the art.

The WDP joints 210 may be interconnected to form the drill string 12. The telemetry system 100 and/or the plurality of WDP joints 210 may transmit the data from the tool 10. An example of a WDP joint that may be used in the telemetry system 100 is described in detail in U.S. Pat. No. 6,641,434 by Boyle et al. Again, the present invention is not limited to a specific embodiment of the telemetry system 100, and reference to the wired drill pipe is merely an example of one embodiment of the telemetry system 100.

The telemetry system 100 may be connected to a first network 200 that may be remote with respect to the borehole 11 and/or the drill string 12. The first network 200 may connect to one or more terminals, such as, for example, a first terminal 211, a second terminal 212 and/or a third terminal 213 (collectively hereinafter "the terminals 211-213"). The first network 200 may connect the terminals 211-213 to the telemetry system 100. The terminals 211-213 may be, for example, a desktop computer, a laptop computer, a mobile cellular telephone, a personal digital assistant ("PDA"), a 4G mobile device, a 3G mobile device, a 2.5G mobile device, an internet protocol (hereinafter "IP") video cellular telephone, an ALL-IP electronic device, a satellite radio receiver, a portable digital audio player, a portable digital video player and/or the like. The terminals 211-233 may be any device that has a capability to communicate with the network. The terminals 211-213 may be remote relative to the drill string 12, the borehole 11 and/or the first network 200. The present invention is not limited to a specific embodiment of the terminals 211-213. Any number of terminals may be connected to the first network 200, and the present invention is not limited to a specific number of terminals.

In an embodiment, the first network 200 may be the Internet wherein the telemetry system 100 and/or the terminals 211-213 may be connected and/or in communication via a telephone network, a broadband network, a wireless network and/or other like network. The first network 200 may be a fixed network, such as, for example, a cabled network, a permanent network and/or the like. In an embodiment, the first network 200 may be a temporary network, such as, for example, a modem network, a null modem network and/or the like. The first network 200 may be, for example, a personal area network, a local area network, a campus area network, a metropolitan area network, a wide area network and/or the like. In an embodiment, the first network 200 may be a wireless network, such as, for example, a wireless metropolitan area network, a wireless local area network, a wireless personal area network, a global standard network, a personal communication system network, a pager-based service network, a general packet radio service, a universal mobile telephone service network, a radio access network and/or the like.

The present invention is not limited to a specific embodiment of the first network 200. It should be understood that the first network 200 may be any network capable of transferring and/or of transmitting the data between the telemetry system 100 and the terminals 211-213 as known to one having ordinary skill in the art. The first network 200 may be any data communication network known to one having ordinary skill in the art.

The first network 200 may connect to a server 220 that may be in communication with a database 229. The server 220 and/or the database 229 may be remote relative to the terminals 211-213. The database 299 may store any information related to the borehole 11, the drill string 12, the BHA 20, the telemetry system 100, the terminals 211-213, the server 200, the first network 200, the formation that may surround the borehole 11 and/or the tool 10. In an embodiment, the database 229 may store the data obtained from the tool 10 and/or the BHA 20, information from the surface location related to the borehole 11, information obtained from the drill string 12 and/or any other information known to one having ordinary skill in the art. For example, the database 229 may store information related to equipment being used at or in the borehole 11, such as, for example, limitations of the equipment, capabilities of the equipment, requirements of the equipment and/or the like.

For example, the database 229 may store well plan information for an area where drilling operations will occur, are occurring and/or have previously occurred. The well plan information may indicate a planned path of the borehole 11 and/or formation locations and/or depths. The well plan information may indicate a time and/or a location for occurrence of planned events, such as, for example, a change in the trajectory, a change in the rate of penetration, a change in the weight-on-bit, a change in drilling fluid rate and/or weight, a replacement of the drill bit 15, a setting of a casing and/or the like. The present invention is not limited to a specific embodiment of the well plan information.

The database 229 may be accessible via a control application 230 associated with the database 229. The tool 10 may transmit the data to the database 229 and/or the control application 230 using the telemetry system 100 and/or the first network 200. The database 229 and/or the control application 230 may store the data. The control application 230 may be provided by and/or stored by a computer readable medium, such as, for example, a compact disc, a DVD, a computer memory, a hard drive and/or the like. The computer readable medium may enable the first network 200 and/or the terminals 211-213 to execute the control application 230.

The control application 230 may enable one or more users to communicate with the tool 10 using the terminals 211-213 as described in more detail hereafter. For example, the control application 230 may have a graphic user interface provided and/or displayed by a standard web browser. Users may use, may access and/or may retrieve the control application 230 using the first network 200. For example, the users may use, may access and/or may retrieve the control application 230 using a web browser provided by any of the terminals 211-213 connected to the first network 200. The database 229 may be accessed by a single application or by multiple applications that may be linked to the database 229.

The tool 10 may be programmed and/or may be designed to generate and/or transmit a report. The tool 10 may be directed to transmit the report by the first network 200, the terminals 211-213 and/or the control application 230. The report may be generated and/or may be transmitted automatically by the tool 10 without instructions from the first network 200, the terminals and/or the control application 230. In such an embodiment, the report may be generated and/or may be transmitted based on operating conditions of the tool 10, conditions of the borehole 11, conditions of the drill string 12 and/or the like. In addition, the report may be generated and/or may be transmitted at predetermined time intervals, such as, for example, daily, hourly and/or the like.

In an embodiment, the report may relate to diagnostic and/or performance information for the tool 10, such as, for example, a potential problem, an operating failure, a potential operating failure, a predicted operating failure and/or the like. The report may have an account of operational activities of the drill string 12 and/or may have information regarding the borehole 11. The report may have and/or may be based on the data. For example, the report may indicate temperature, shock, rotating bending, oil levels, remaining battery life, flow rates and/or the like for various points in time and/or various locations of the tool 10, the drill bit 15, the BHA 20 and/or the drill string 12. The report may provide a detailed view of the borehole 11. For example, the report may have a two-dimensional visual representation of the borehole 11 and/or a three-dimensional visual representation of the borehole 11. In an embodiment, the report may provide analysis regarding data obtained by the tool 10.

The control application 230 and/or the tool 10 may be programmed and/or may be designed to determine whether to generate and/or transmit the report and/or the data. The tool 10 may transmit the report and/or the data using the telemetry system 100. The report may be transmitted from the tool 10 to the database 229 and/or the terminals 211-213 using the telemetry system 100 and/or the first network 200. The user may be informed of generation and/or availability of the report. For example, an email, a pager message, a text message and/or the like may indicate the availability of the report.

The data may have and/or may be images. For example, the tool 10 may have one or more cameras that may obtain the images of the drill string 12, the tool 10 and/or a circuit board connected to the tool 10. In an embodiment, one or more of the images may be thermal images of the drill string 12, the tool 10 and/or the circuit board connected to the tool 10. For example, the thermal images may indicate radiation in the infrared range of the electromagnetic spectrum.

The data may have and/or may be audio data. For example, the tool 10 may have one or more microphones that may obtain sounds produced by the drill string 12 and/or the tool 10. The tool 10 and/or the control application 230 may associate the audio data with a location within the drill string 12, such as, for example, a location of the microphone that obtained the audio data. In an embodiment, the control application 230 may enable the user to select a location within the drill string 12 and/or to listen to the audio data associated with the selected location within the drill string 12. Thus, the audio data may enable the user to listen to sounds produced by different locations within the drill string 12. For example, the user may use the one or more microphones and/or the audio data to listen to sounds produced by the drill bit 15.

The control application 230 and/or the tool 10 may be programmed and/or may be designed to determine whether to transmit a portion of the data. For example, the tool 10 may obtain the data. Then, the tool 10 may transmit a portion of the data to the database 229 and/or the terminals 211-213 using the telemetry system 100 and/or the first network 200. Further, the control application 230 and/or the tool 10 may be programmed and/or may be designed to process the data. For example, the tool 10 may obtain the data. Then, the tool 10 may process the data. Then, the tool 10 may transmit processed data to the database 229 and/or the terminals 211-213 using the telemetry system 100 and/or the first network 200. The processed data may enable the telemetry system 100 to transmit the data more quickly relative to unprocessed data and/or with less of a burden on the telemetry system 100 relative to unprocessed data. The terminals 211-213 may transmit algorithms to the tool 10, and/or the tool 10 may use the algorithms to process the data. For example, the terminals 211-213 may transmit the algorithms to the tool 10 using the telemetry system 100 and/or the first network 200.

In response to the report and/or the data, the user and/or one or more of the terminals 211-213 may direct the tool 10 to obtain additional data. For example, the user and/or the one or more of the terminals 211-213 may direct the tool 10 to obtain the additional data using the telemetry system 100. The tool 10 may obtain the additional data, and/or the tool 10 may transmit the additional data to the user and/or the one or more of the terminals 211-213 that requested the additional data. For example, the tool 10 may transmit the additional data to the user and/or the one or more of the terminals 211-213 using the telemetry system 100. Any number of communications between the tool 10 and the one or more of the terminals 211-213 may occur. For example, the one or more of the terminals 211-213 may respond to the additional data by requesting yet another data set from the tool 10.

In an embodiment, the tool 10 may transmit the report and/or the data to a remote diagnostic system using the telemetry system 100 and/or the first network 200. In response to the report and/or the data, the remote diagnostic system may direct the tool 10 to obtain additional data. The remote diagnostic system may be programmed to automatically determine whether to request the additional data such that the remote diagnostic system requests the additional data without user input. The remote diagnostic system may be programmed to determine whether to request the additional data based on information provided by the database 229 and/or any other source. For example, the remote diagnostic system may be programmed to determine whether to request the additional data based on the well plan information, the information related to equipment being used at or in the borehole 11, and/or the like. The remote diagnostic system may direct the tool 10 to obtain the additional data using the telemetry system 100. The tool 10 may obtain the additional data, and/or the tool 10 may transmit the additional data to the remote diagnostic system. For example, the tool 10 may transmit the additional data to the remote diagnostic system using the telemetry system 100. Any number of communications between the tool 10 and the remote diagnostic system may occur. For example, the remote diagnostic system may respond to the additional data by requesting yet another data set from the tool 10.

The control application 230 may periodically obtain the data and/or the report. The tool 10 and/or the control application 230 may aggregate and/or may compile the data and/or the report at various points in time for trend analysis. For example, the trend analysis may indicate a rate of tool wear for a specific type of tool, a rate of change of temperature as a function of depth, a rate of mud flow as a function of drilling time and/or the like.

The control application 230 and/or the tool 10 may be programmed and/or may be designed to compare the data to parameters to determine whether to generate and/or transmit the report and/or the data. The parameters may be, for example, a desired inclination of the borehole 11, a desired flow rate, a desired rate of penetration, a desired fluid density, a desired viscosity and/or the like. For example, the parameters may be based on the planned path for the borehole 11. The parameters may be determined and/or may be provided by one or more of the terminals 211-213 using the first network 200, may be accessed from the database 229 using the first network 200 and/or may be calculated by the control application 230 and/or the tool 10. The parameters may be any parameters known to one having ordinary skill in the art. The present invention is not limited to a specific embodiment of the parameters.

The parameters may be determined using model matching that may utilize the well plan information, the data obtained by the tool 10, any data stored by the database 229 and/or the like. The model matching may be used to determine if the telemetry system 100 generates and/or transmits the report. For example, the parameters may be associated with the well plan information. If the data does not correspond to the parameters associated with well plan information, the tool 10 may determine that drilling conditions changed. For example, if the control application 230 and/or the tool 10 determine that the borehole 11 deviates from the planned path for the borehole 11, the control application 230 and/or the tool 10 may indicate that drilling conditions changed.

If the drilling conditions changed, the control application 230 and/or the tool 10 may transmit the report and/or the data using the telemetry system 100. If the drilling conditions changed, the control application 230, the tool 10 and/or the terminals 211-213 may calculate, may generate and/or may transmit an updated model. For example, the updated model may indicate an updated path of the borehole 11 and/or updated formation locations and/or depths. The updated model may indicate an updated time and/or an updated location for occurrence of the planned events, such as, for example, the change in the trajectory, the change in the rate of penetration, the change in the weight-on-bit, the change in drilling fluid rate and/or weight, the replacement of the drill bit 15, the setting of the casing and/or the like. The updated time and/or the updated location of the planned events in the updated model may be different than the time and/or the location of the planned events in the well plan information. As a further example, the updated model may indicate responsiveness of the steering mechanism 50 in controlling the direction of drilling, the rotation of the drill string 12, the inclination of the borehole 11 and/or the azimuth of the borehole 11. The updated model may indicate whether the direction of drilling established by the steering mechanism 50 conforms to the desired direction of drilling. As yet another example, the updated model may indicate updated features of the borehole 11, such as, for example, an updated trajectory.

Moreover, the updated model may revise the planned path and/or provide the updated path for the borehole 11.

For example, the updated model may indicate revised characteristics of the area where the drilling operations occur. The revised characteristics in the updated model may be different than the characteristics in the well plan information. The characteristics of the area where the drilling operations occur may be, for example, expected values that may variate from actual values. As a further example, the characteristics of the area may have changed due to formation of the borehole 11.

The control application 230 and/or the tool 10 may adjust the drilling operations based on the updated model. The control application 230 and/or the tool 10 may adjust the drilling operations without instructions from the first network 200 and/or the terminals 211-213. For example, the control application 230 and/or the tool 10 may adjust a direction of drilling, decrease a rotational speed of the drill string 12, change a flow rate of the drilling fluid, increase the rotational speed of the drill string 12, decrease a down-hole force and/or weight on the drill bit 15, increase the down-hole force and/or weight on the drill bit 15 and/or the like based on the updated model. The control application 230 and/or the tool 10 may adjust operational parameters of the tool 10 to optimize performance, determine a characteristic of the borehole 11 and/or the drill string 12 and/or otherwise control the tool 10.

The well plan information may indicate a casing point for the borehole 11. The casing point may be a location where casing pipe is lowered into the borehole 11 and maintained in a fixed position, such as, for example, by cement. The casing pipe may be used to isolate formations having different pressure gradients. The data may be used to determine the casing point and/or a revised casing point. For example, the data may indicate the different pressure gradients of the formations located proximate to the borehole 11. The control application 230 and/or the tool 10 may use the different pressure gradients as indicated by the data to determine the casing point and/or the revised casing point. The control application 230 and/or the tool 10 may determine the casing point and/or the revised casing point without instructions from the first network 200 and/or the terminals 211-213. The updated model may indicate the pressure gradients and/or the revised casing point.

For example, the tool 10 may be and/or may be associated with the steering mechanism 50 connected to the drill string 12 and/or the drill bit 15. The steering mechanism 50 may adjust the drilling operations and/or the direction of drilling. The steering mechanism 50 may use the data to maintain the inclination of the borehole 11 and/or the azimuth of the borehole 11. For example, the steering mechanism 50 may maintain the inclination of the borehole 11 and/or the azimuth of the borehole 11 without instructions from the first network 200 and/or the terminals 211-213. As a further example, for vertical drilling, the steering mechanism 50 may maintain a vertical orientation of the borehole 11 without instructions from the first network 200 and/or the terminals 211-213. The steering mechanism 50 may use the data to maintain continuous rotation of the drill string 12. For example, the steering mechanism 50 may maintain the continuous rotation of the drill string 12 without instructions from the first network 200 and/or the terminals 211-213.

In an embodiment, the tool 10, such as, for example, the steering mechanism 50, may obtain the data, the well plan information and/or the like from the database 229 and/or the first network 200. The data, the well plan information and/or the like may be required and/or may be beneficial for operation of the tool 10. For example, the steering mechanism 50 may obtain formation-related information from the database 229, and/or the formation-related information may relate to another wellbore located near the borehole 11, another wellbore that used similar equipment as the borehole 11 and/or the like. The steering mechanism 50 may be, for example, a rotary steerable system as known to one having ordinary skill in the art. The present invention is not limited to a specific embodiment of the steering mechanism 50.

The control application 230 and/or the tool 10 may be programmed and/or may be designed to utilize the well plan information, the updated model and/or the data to calculate and/or determine a predicted state of the tool 10. The predicted state of the tool 10 may be, for example, a predicted location of the tool 10 at a specific future point in time, a predicted temperature of the tool 10 for a specific location of the tool 10, a predicted power level of the tool at a specific future point in time and/or a specific location of the tool 10, a predicted level of operation relative to maximal operation at a specific future point in time and/or a specific location of the tool 10 and/or the like. The present invention is not limited to a specific embodiment of the predicted state of the tool 10.

The control application 230 and/or the tool 10 may compare the predicted state of the tool 10 to the parameters. The control application 230 and/or the tool 10 may determine whether to generate and/or transmit the report based on comparison of the predicted state of the tool 10 to the parameters. For example, the control application 230 and/or the tool 10 may determine to transmit the report based on determination that a predicted temperature of the tool 10 may exceed a threshold temperature at a specific future time. The tool 10 may transmit the report using the telemetry system 100.

The control application 230 and/or the tool 10 may adjust the drilling operations based on the predicted state of the tool 10, and/or the control application 230 and/or the tool 10 may adjust the drilling operations without instructions from the first network 200 and/or the terminals 211-213. For example, if the predicted state of the tool 10 indicates that the tool 10 may exit a target reservoir, the control application 230 and/or the tool 10 may adjust the drilling operations so that the tool 10 does not exit the target reservoir. The control application 230 and/or the tool 10 may adjust the drilling operations so that the tool 10 does not exit the target reservoir without instructions from the first network 200 and/or the terminals 211-213. For example, the steering mechanism 50 may adjust the drilling operations so that the tool 10 does not exit the target reservoir.

The control application 230 and/or the tool 10 may be programmed and/or may be designed to generate and/or transmit a recommendation. For example, the control application 230, the telemetry system 100 and/or the tool 10 may generate and/or may transmit the recommendation if the drilling conditions may have changed. The tool 10 may transmit the recommendation using the telemetry system 100. The recommendation may be, for example, a recommended adjustment of the drilling operations, a recommended request for additional data, a recommended and/or the like. The recommendation may be that control of the drilling operations by the one or more terminals 211-213 may be inappropriate, such as, for example, that the user has established a rate of penetration that may be too high. The recommendation may be based on the predicted state of the tool 10, the updated model and/or the data.

The report may have the recommendation. The control application 230 may display the recommendation on the terminals 211-213. The user may be informed of generation and/or availability of the recommendation, such as, for example, by an email, a pager message, a text message and/or the like. In an embodiment, the tool 10 may transmit the recommendation to the remote diagnostic system. The remote diagnostic system may be programmed to override one or more of terminals 211-213 based on the recommendation. For example, the recommendation may indicate that instructions from one or more of terminals 211-213 may result in a problem and/or may cause the drilling operations to be less than optimal. In response to the recommendation, the remote diagnostic system may evaluate, may adjust, and/or may cancel the instructions.

The user may accept the recommendation using the control application 230 and/or the terminals 211-213. The control application 230 and/or the terminals may use the first network 200 to transmit a first signal to the telemetry system 100 and/or the tool 10. The first signal may indicate that the recommendation was accepted. The telemetry system 100 and/or the tool 10 may adjust the drilling operations based on the second signal.

For example, the control application 230, the telemetry system 100 and/or the tool 10 may utilize the data and/or the well plan information to determine that the drilling conditions changed. The control application 230, the telemetry system 100 and/or the tool 10 may generate and/or transmit the recommendation. The recommendation may be, for example, "decrease depth of casing point by 500 meters." The control application 230 may display the recommendation on the terminals 211-213. The user may be informed of generation and/or availability of the recommendation. The user may accept the recommendation using the control application 230 and/or the terminals 211-213. The control application 230 and/or the terminals may use the first network 200 to transmit a first signal indicating that the recommendation was accepted to the tool 10. For example, the first signal may be transmitted to the tool 10 using the telemetry system 100. The control application 230 and/or the tool 10 may adjust the drilling operations to conform to the recommendation, such as, for example, by adjusting the drilling operations so that the casing point has a depth decreased by 500 meters.

The control application 230 may display and/or may provide access to the report, the predicted state of the tool 10, the well plan information, the updated model and/or the data. For example, a user that may be associated with a service company operating the drill string 12 may access the report from the control application 230 using a user name, an email address, a name of a business associated with the user, a password, an identification number, an IP address and/or the like.

The user and/or the service company may be informed of generation and/or availability of the predicted state of the tool 10, the updated model and/or the data on the control application 230. For example, an email, a pager message, a text message and/or the like may indicate the availability of the predicted state of the tool 10, the updated model and/or the data on the control application 230.

The control application 230 may be designed and/or may be programmed to accept user input from the terminals 211-213. For example, the user input may be a command and/or an observation. The command may be, for example, input that controls and/or adjusts the drilling operations. The observation may be, for example, a comment on the drilling operations, a remark about the data and/or the like. The command and/or the observation may be stored by the control application 230 and/or the database 229. The present invention is not limited to a specific embodiment of the user input, the command and or the observation.

A second signal that corresponds to the command may be transmitted to the drill string 12 and/or the tool 10 using the network 100 and/or the telemetry system 100. The drill string 12 and/or the tool 10 may adjust the drilling operations of the drill string 12 based on the second signal. For example, the drill string 12 and/or the tool 10 may decrease the rotational speed of the drill string 12, increase the rotational speed of the drill string 12, decrease the down-hole force on the drill bit 15, increase the down-hole force on the drill bit 15 and/or the like based on the second signal.

For example, a first user may use the first terminal 211 and/or the control application 230 to view the data and/or input a first observation regarding the data. The control application 239 and/or the database 229 may store the first observation. A second user may use the second terminal 212 and/or the control application 230 to view the data, view the first observation and/or input a first command. The second signal may correspond to the first command and/or may be transmitted to the drill string 12 and/or the telemetry system 100 using the network 100. The drill string 12 and/or the tool 10 may adjust the drilling operations of the drill string 12 based on the second signal. A third user may use the third terminal 213 and/or the control application 230 to view the data, the first observation and/or the first command. The third user may use the third terminal 213 and/or the control application 230 to input a second observation and/or a second command.

The control application 230 may provide display options for the report, the data, the well plan information, the updated model and/or the predicted state of the tool 10. For example, the display options for the control application 230 may provide a plurality of formats, such as, for example, standard log formats, two-dimensional images, three-dimensional images and/or the like. As a further example, the display options for the control application 230 may support a plurality of media, such as, for example, a computer readable medium, a hard-copy paper printout, a digital file and/or the like. The physical computer readable medium may be, for example, a compact disc, a DVD, a computer memory, a hard drive and/or the like. The digital file may be, for example, an Adobe Acrobat (registered trademarks of Adobe Systems Inc.) PDF file, a Microsoft (registered trademark of Microsoft Corp.) Word file and/or the like.

The control application 230 may be a Wiki application. The Wiki application may be a collection of web pages that may be interconnected by hyperlinks. The web pages may be written in a markup language such that a set of codes may govern how text may be displayed. Thus, the control application 230 may be designed to enable users to contribute and/or to modify content of the control application 230. The control application 230 may enable multiple users to simultaneously request and/or obtain different types of information regarding the drill string 12 using a standard web browser.

For example, the control application 230 may be designed to provide hyperlinks that connect to the reports, the well plan information, the predicted state of the tool 10, the updated model, the data, the instructions and/or the observations. The hyperlinks may provide data files, numeric data, graphic representations and/or the like. The control application 230 may enable the content to be written according to a Wiki syntax, such as, for example, having special characters that may indicate hyperlinked content, bulleted content and/or the like. The control application 230 may support addition of new data and/or searching for pre-existing data that matches desired criteria.

The control application 230 may enable a user to provide the instructions to adjust the drilling operations of the drill string 12 and/or the directions to record and/or obtain additional data in a relatively simple language. For example, the user may input a term that may be a request for information, such as "shock," "vibration," "temperature" and/or the like, into the control application 230. The control application 230 and/or the tool 10 may obtain, may transmit and/or may display a corresponding response based on the term. The tool 10 may transmit the corresponding response using the telemetry system 100.

For example, the term may be a command, such as "reduce torque." The command may be input into the control application 230 and/or may be transmitted to the tool 10 using the telemetry system 100. The control application 230 and/or the tool 10 may be designed to adjust the drilling operations to conform to the command, such as, for example, by reducing the torque.

In addition, the control application 230 may be designed and/or may be programmed to effect timing language of the term. The timing language may be, for example, an event, an amount of drilling time, a time associated with a date, a location of the drill string 12 and/or the like. For example, the control application 230 may be programmed and/or may be designed to accept and/or input of the term "decrease inclination after casing point." The control application 230 and/or the tool 10 may be designed to adjust the drilling operations to conform to the command, such as, for example, by increasing the inclination after the casing pipe is lowered into the borehole 11.

As a further example, the control application 230 may be programmed and/or may be designed to accept input of the term "increase rotations per minute at 9,000 meters depth." The control application 230 and/or the tool 10 may be designed to adjust the drilling operations to conform to the command, such as, for example, by increasing rotations per minute of the drill string 12 if the drill bit reaches a depth of 9,000 meters.

One or more of the terminals 211-213 may direct the control application 230 and/or the tool 10 to obtain the additional data. A third signal may be transmitted to the tool 10 using the telemetry system 100 and/or the first network 200. The third signal may direct the tool 10 to record and/or obtain the additional data. The tool 10 may record and/or obtain the additional data, and/or the telemetry system 100 may transmit the additional data to the database 229 and/or the terminals 211-213. The control application 230 may be designed to display the additional data, and/or the database 229 may store the additional data. The report may have the additional data, and/or the updated model may be based on the additional data. The application 230 may have a hyperlink for accessing and/or viewing the additional data.

For example, the first user may direct the control application 230 and/or the tool 10 to obtain, record and/or transmit bursts of high frequency data of a particular channel. The control application 230 may provide and/or may display the bursts of the high frequency data of the particular channel. The application 230 may have a hyperlink for accessing and/or viewing the bursts of the high frequency data of the particular channel. The application 230 may display the bursts of the high frequency data of the particular channel on any of the terminals 211-213.

The first user, the second user and/or the third user may use the control application 230 to request the additional data substantially simultaneously. For example, the first user, the second user and/or the third user may substantially simultaneously input a first request for the additional data, a second request for the additional data and/or a third request for the additional data, respectively. The first request, the second request and/or the third request may be different requests. The control application 230 and/or the tool 10 may be programmed and/or may be designed to obtain and/or transmit first additional data, second additional data and/or third additional data that fulfills the first request, the second request and/or the third request, respectively. For example, the tool 10 may transmit the first additional data, the second additional data and/or the third additional data using the telemetry system 100. The control application 230 may provide access to the first additional data, the second additional data and/or the third additional data on each of the terminals 211-213. For example, the first user may access and/or may view the first additional data, the second additional data and/or the third additional data on the first terminal 211 using hyperlinks provided by and/or displayed by the control application 230.

The control application 230 may enable the service company operating the drill string 12 to collaborate with one or more additional parties. The service company and/or the additional parties may use the control application 230 to obtain and/or access the data, the additional data, the report, the well plan information, the updated model and/or the predicted state of the tool 10. For example, the service company may direct the tool 10 to obtain, record and/or transmit the additional data, and the additional parties may subsequently access the additional data using the control application 230. The service company and/or the additional parties may use the control application 230 to adjust and/or control the drilling operations. The additional parties may be, for example, an operator, a client, a contractor, a consultant and/or the like.

The control application 230 may enable the service company and/or the additional parties to obtain and/or access the data, the additional data, the report, the well plan information, the updated model and/or the predicted state of the tool 10 from one or more locations that may be remote relative to the drill string 12. The service company and/or the additional parties may use the control application 230 and/or the tool 10 to adjust and/or control the drilling operations from one or more locations that are remote relative to the drill string 12 and/or the tool 10.

The service company and/or the additional parties may customize the control application 230. For example, if the client has a production goal, the interface of the control application 230 may display the production goal, a current status indicating how much of the production goal has been achieved and/or an estimated production total. The interface of the control application 230 may display portions of the data, the additional data, the report, the well plan information, the updated model and/or the predicted state of the tool 10 that may be most relevant to the production goal. For example, the service company and/or the additional parties may determine and/or may select the portions of the data, the additional data, the report, the well plan information, the updated model and/or the predicted state of the tool 10 displayed by the interface of the control application 230. The client may use the control application 230 to access other portions of the data, the additional data, the report, the well plan information, the updated model and/or the predicted state of the tool 10 not displayed by the interface of the control application 230.

Figure 2:
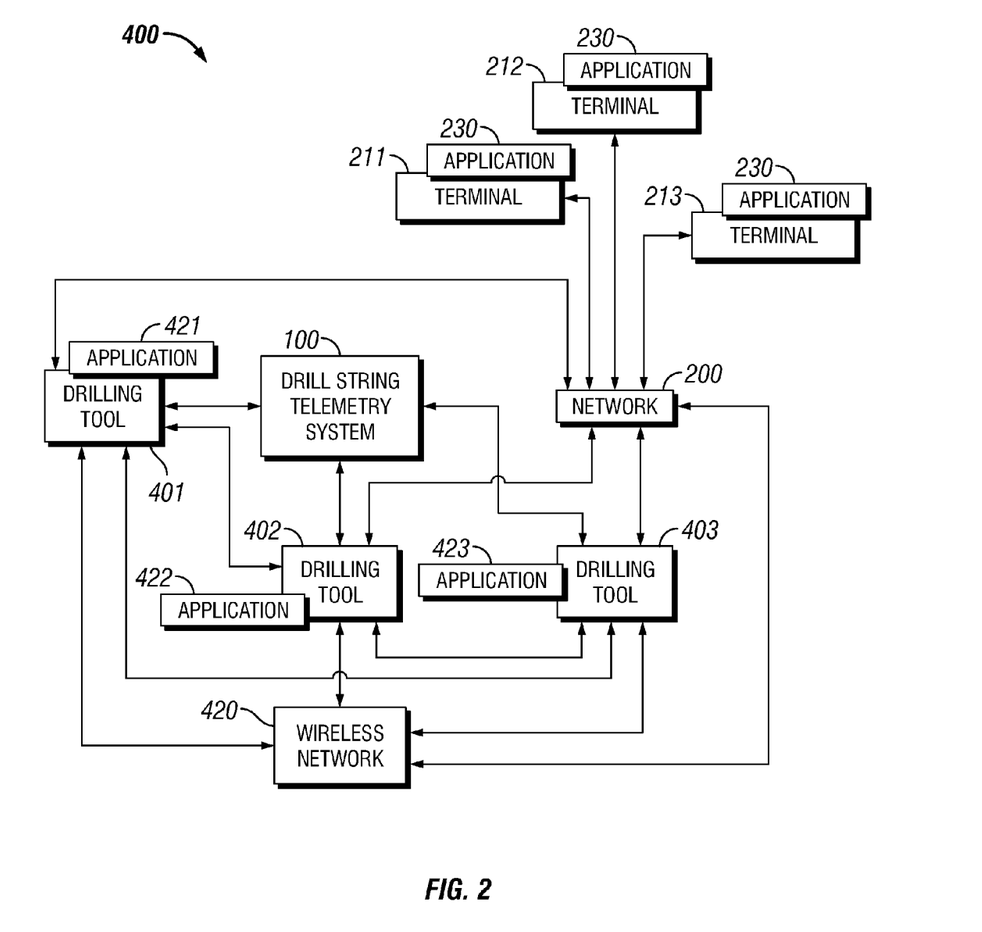
FIG. 2 illustrates a black box diagram of a system for managing and/or using data for tools in a wellbore in an embodiment of the present invention.

FIG. 2 generally illustrates a system 400 for managing drilling data using a first tool 401, a second tool 402 and/or a third tool 403 (collectively hereafter "the tools 401-403"). The tools 401-403 may be, for example, a wireline configurable tool, a logging tool, a measurement tool, a sampling tool, a MWD/LWD tool, a sampling tool, a sampling device, a device used in intelligent and/or smart well completion, an actuator, a lock, a release mechanism, a data recorder, a resistivity array device, an acoustic device, a downhole memory unit, a downhole controller, a perforating device, a shape charge, a firing head, a locator and/or the like. The tools 401-403 may be used to create the borehole 11 and/or may provide measurements regarding the borehole 11, a formation adjacent to the borehole 11, the drill string 12 and/or any component of the drill string 12. For example, the tools 401-403 may be and/or may have a measurement-while-drilling ("MWD") tool, a logging-while-drilling ("LWD") tool, a strain measuring device, a torque measuring device, a temperature measuring device, a seismic tool, a resistivity tool, a direction measuring device, an inclination measuring device, a weight-on-bit measuring device, a vibration measuring device, a shock measuring device, a stick-slip measuring device, a drilling tool used to create the borehole 11 and/or the like. In an embodiment, the tool 10 may be a wireline configurable tool, such as a tool commonly conveyed by wireline cable as known to one having ordinary skill in the art. The tools 401-403 may be any tool known to one having ordinary skill in the art. The present invention is not limited to a specific embodiment of the tools 403 or a specific number of the tools. Any number of tools may connect to the first network 200.

The tools 401-403 may connect to the telemetry system 100. Alternatively, the tools 401-403 may connect to the first network 200 without using the telemetry system 100. The tools 401-403 may automatically register with the system 400 and/or may automatically connect to the first network 200 without input by the first network 200 and/or the terminals 211-213. The automatic registration and/or automatic connection by the tools 401-403 may enable transmission of the data to the first network 200, the database 229 and/or the terminals 211-213. Automatic registration and/or automatic connection by the tools 401-403 may enable control of the tools 401-403 by the terminals 211-213 and/or the control application 230.

The tools 401-403 may connect to the first network 200 using a wireless protocol so that the tools 401-403 do not connect to the telemetry system 100. For example, the tools 401-403 may connect to the first network 200 using a wireless network 420, such as, for example, a wireless local area network (WLAN), a wireless metropolitan area network (WMAN/WiMax), a wireless personal area network (WPAN), a global standard network (GSM), a personal communication system network (PCS), a pager-based service network, a general packet radio service, a universal mobile telephone service network, a radio access network and/or the like. For example, the wireless network 420 may utilize IEEE 802.11 technology, Bluetooth technology (certification mark of Bluetooth SIG, Inc.), wireless ethernet technology (Wi-Fi) and/or the like. The wireless network 420 may be any wireless network known to one having ordinary skill in the art, and the present invention is not limited to a specific embodiment of the wireless network 420.

The tools 401-403 may connect to the first network 200 and/or the wireless network 420 using Dynamic Host Configuration Protocol (DHCP). DHCP is a network application protocol that may be used by a device to obtain configuration information for operation in an Internet Protocol network. If a DHCP-configured device connects to a network, the DHCP-configured device may send a broadcast query requesting information from a DHCP server. The DHCP server may assign the DHCP-configured device with an IP address, a lease representing an amount of time for which the IP address may be valid and/or other IP-configuration parameters. Thus, the tools 401-403 may connect to the first network 200 and/or the control application 230 without connecting to the telemetry system 100 using DHCP, for example.

The control application 230 may maintain and/or may utilize Service Oriented Architecture ("SOA") for managing Internet-based services. Numerous well-known protocols and standards may be implemented in SOA as known to one having ordinary skill in the art. SOA may enable communication between the control application 230 and an external service using a structured document. The structured document may conform to a communications protocol and/or may be composed exclusively of human readable text with common letters and characters. The control application 230 may employ SOA to manage data provided by a plurality of different tools.

For example, the control application 230 may employ SOA to manage information provided by different applications executed by the tools 401-403. For example, the first tool 401, the second tool 402 and/or the third tool 403 may support and/or may execute a first application 421, a second application 422 and/or a third application 423 (collectively hereafter "the applications 421-423"); respectively.

As discussed previously, the application 230 may have a graphic user interface provided and/or displayed by a standard web browser. Connection of the tools 401-403 to the application 230 may enable the application 230 to manage and/or display information provided by the applications 421-423. The information provided by the applications 421-423 may be, for example, capabilities of the corresponding tool; a location of the corresponding tool; a status of the corresponding tool, such as, for example, idle; operating; functional; nonfunctional, such as, for example, damaged, requiring service and/or the like; a rate of operation, such as, for example, a speed, a frequency and/or the like; and/or a power level. The connection of the tools 401-403 to the application 230 may enable the application 230 to manage and/or display the information provided by the applications 421-423 using the graphic user interface of the application 230. The present invention is not limited to a specific embodiment of the information provided by the applications 421-423.

One or more of the tools 401-403 may use and/or may execute a first protocol (hereafter "first protocol tools"). The first protocol tools may transmit the data using the first protocol. The first protocol may not be supported by the first network 200. For example, use of the first protocol may prevent communication of the first protocol tools with the control application 230, the telemetry system 100, the wireless network 420 and/or the first network 200. For example, the first protocol may be and/or may use a proprietary protocol.

One or more of the tools 401-403 that may use and/or may execute a second protocol may act as a linking tool. The second protocol may enable communication with the first network 200. For example, the second protocol may be a Transmission Control Protocol/Internet Protocol ("TCP/IP protocol") as discussed in further detail hereafter. The first protocol tools may register with and/or connect to the linking tool. Connection of the first protocol tools to the linking tool may enable the first protocol tools to communicate with the control application 230, the telemetry system 100, the wireless network 420 and/or the first network 200. For example, the first protocol tools may transmit the information to the linking tool using the first protocol. The linking tool may convert the information from the first protocol to the second protocol. The linking tool may transmit the information to the control application 230, the telemetry system 100, the wireless network 420 and/or the first network 200 using the second protocol. The first protocol tools may automatically register with and/or may automatically connect to the linking tool.

The linking tool may integrate the tools 401-403 into a common network that may be connected to the control application 230, the telemetry system 100, the wireless network 420 and/or the first network 200. Thus, the linking tool may act as an access point that may enable the control application 230, the telemetry system 100, the wireless network 420, the first network 200 and/or the terminals 211-213 to monitor, communicate with and/or control the tools 401-403.

The control application 230 may indicate the registration and/or the connection of the tools 401-403. The control application 230 may provide and/or may display the information provided by the applications 421-423. A user of one or more of the terminals 211-213 may utilize the application 230, the first network 200, the telemetry system 100 and/or the wireless network 420 to communicate with and/or control the tools 401-403. For example, if the tools 401-403 are associated with the drill string 12, the control application 230 may use integration of the tools 401-403 by the linking tool to control any component of the drill string 12. Thus, the system 400 may be a world-wide system of tools automatically registered and/or automatically connected to the first network 200 to be monitored by, communicated with and/or controlled by the application 230.

For example, the first tool 402 and/or the second tool 402 may be the first protocol tools such that the first tool 402 and/or the second tool 402 may not be capable of communication with the control application 230, the telemetry system 100, the wireless network 420 and/or the first network 200. The third tool 403 may use the second protocol to act as the linking tool. The first tool 401 and/or the second tool 402 may communicate with the third tool 403. Communication of the first tool 401 and/or the second tool 402 with the third tool 403 may enable the first tool 401 and/or the second tool 402 to communicate with the control application 230, the telemetry system 100, the wireless network 420 and/or the first network 200. Thus, the third tool 403 may act as the access point that may enable the control application 230, the telemetry system 100, the wireless network 420, the first network 200 and/or the terminals 211-213 to communicate with the first tool 402 and/or the second tool 402.

The linking tool may be located remotely relative to the tools 401-403. For example, the linking tool may be located at a surface location that is above the drilling surface. Alternatively, the linking tool may be connected to the drill string 12 and/or may be located within and/or adjacent to the borehole 11. For example, the linking tool may be connected to the BHA 20. Any number of linking tools may be associated with the drill string 12, and the present invention is not limited to a specific embodiment of the linking tool.

The linking tool may obtain and/or may convert the information from the first protocol tools without and/or before communication of the linking tool with the control application 230, the telemetry system 100, the wireless network 420 and/or the first network 200. Thus, the linking tool may decrease a time associated with the registration and/or the connection of the first protocol tools to the system 400.

For example, the first protocol tools may transmit the information to the linking tool using the first protocol without and/or before communication of the linking tool with the control application 230, the telemetry system 100, the wireless network 420 and/or the first network 200. The linking tool may convert the information to the second protocol without and/or before communication of the linking tool with the control application 230, the telemetry system 100, the wireless network 420 and/or the first network 200. If the linking tool connects to the control application 230, the telemetry system 100, the wireless network 420 and/or the first network 200, the linking tool may transmit the data using the second protocol.

The control application 230 may indicate the registration and/or the connection of the tools 401-403. The control application 230 may provide and/or may display the information provided by the applications 421-423. A user of one or more of the terminals 211-213 may utilize the application 230, the first network 200, the telemetry system 100 and/or the wireless network 420 to communicate with and/or control the tools 401-403.

The linking tool may perform diagnostic tests on the tools 401-403. User input into the first network 200 and/or the terminals 211-213 may direct the linking tool to perform the diagnostic tests. The linking tool may perform the diagnostic tests without instructions from the first network 200 and/or the terminals 411-413. For example, the linking tool may perform the diagnostic tests periodically, such as, for example, at predetermined time intervals. The linking tool may perform the diagnostic tests based on information obtained from one or more of the tools 401-403. The linking tool may determine and/or may transmit results of the diagnostic tests using the telemetry system 100, the wireless network 420 and/or the first network 200.

The linking tool and/or the control application 230 may be designed to program, control and/or optimize the tools 401-403. For example, the linking tool and/or the control application 230 may program, control and/or optimize function and/or operation of the tools 401-403. As a further example, the linking tool and/or the control application 230 may calibrate the tools 401-403. As yet another example, the linking tool and/or the control application 230 may configure the tools 401-403 based on conditions that the tools 401-403 may encounter, such as, for example, shock, temperature and/or a type of formation located in area where the drilling operations occur. The linking tool may program, may control and/or may optimize the tools 401-403 without connection and/or before connection to the control application 230, the telemetry system 100, the wireless network 420 and/or the first network 200.

The linking tool and/or the control application 230 may program, may control and/or may optimize the tools 401-403, the BHA 20 and/or any other component of the drill string 12 to optimize the operation of the tools 401-403 and/or the drilling process. For example, if the linking tool receives the information from the tools 401-403, the linking tool and/or the control application 230 may utilize and/or may analyze the information to program, control and/or optimize the tools 401-403 and/or the other components of the drill string 12.

For example, if the steering mechanism 50 connects to and/or associates with the drill string 12, the steering mechanism 50 may transmit the information to the linking tool. The information may be, for example, capabilities of the steering mechanism 50. The linking tool and/or the control application 230 may utilize the capabilities of the steering mechanism to program, control and/or optimize the steering mechanism 50. The linking tool and/or the control application 230 may utilize the capabilities of the steering mechanism 50 to program, control and/or optimize the tools 401-403 and/or the other components of the drill string 12.

The linking tool and/or the control application 230 may use the information from the tools 401-403 to determine, generate and/or transmit a state of the drill string 12. The state of the drill string 12 may be, for example, capabilities of the drill string 12, limits on operation of the drill string 12, a component of the drill string 12 that may be operating at less than maximal operation and/or desired operation, a component of the drill string 12 that may currently require service, a component of the drill string that may require service in the near future, operations of the drill string 12 that may require different components and/or adjustment of activity by current components and/or the like. The present invention is not limited to a specific embodiment of the state of the drill string 12.

The state of the drill string 12 may be based on the information from the tools 401-403. For example, the state of the drill string 12 may be based on the capabilities of the tools 401-403, the location of the tools 401-403 and/or a power level of the tools 401-403. As a further example, the linking tool and/or the control application 230 may determine the state of the drill string 12 based on the capabilities of the steering mechanism 50 that may be connected to the drill string 12.

The control application 230 and/or the linking tool may transmit the information from the tools 401-403 and/or the state of the drill string 12. For example, the linking tool may transmit the information from the tools 401-403 and/or the state of the drill string 12 to the network 200 using the telemetry system 100 and/or the wireless network 420. For example, the linking tool may transmit the information from the tools 401-403 and/or the state of the drill string 12 to the terminals 211-213. The control application 230 and/or the linking tool may determine whether to transmit the information from the tools 401-403 and/or the state of the drill string 12 without instructions from the network 200 and/or the terminals 211-213. For example, the control application 230 and/or the linking tool may determine whether to transmit the information from the tools 401-403 and/or the state of the drill string 12 based on the presence of the component of the drill string 12 that may be operating at less than maximal operation and/or desired operation. As another example, the control application 230 and/or the linking tool may transmit the information from the tools 401-403 based on the data obtained from one or more of the tools 401-403.

The control application 230 may display the information from the tools 401-403 and/or the state of the drill string 12 on the terminals 211-213. The user and/or the service company may be informed of the availability of the information from the tools 401-403 and/or the state of the drill string 12, such as, for example, by an email, a pager message, a text message and/or the like. The control application 230 and/or the inking tool may transmit the information from the tools 401-403 and/or the state of the drill string 12 based on user input on the terminals 211-213.

For example, the control application 230 and/or the linking tool may determine that one of the tools 401-403 may have a malfunction and/or damage. The control application 230 and/or the linking tool may transmit the information from the tools 401-403 and/or the state of the drill string 12 without instructions from the first network 200 and/or the terminals 211-213. The information from the tools 401-403 and/or the state of the drill string 12 may indicate and/or may describe one or more of the tools 211-213, the malfunction and/or the damage. The control application 230 may display the information from the tools 401-403 and/or the state of the drill string 12 on the terminals 211-213. The control application 230 and/or the linking tool may optimize function of the drill string 12 to overcome and/or to correct the malfunction and/or damage.

The tools 401-403, the linking tool and/or the control application 230 may determine a time for service of one or more of the tools 401-403. The service may be, for example, tool maintenance, tool repair, tool replacement and/or the like.

As a further example, the tools 401-403 may perform board environment recording. The board environment recording may be conducted by a processor and/or a memory associated with a circuit board connected to each of the tools 401-403. The board environment recording may record conditions, such as, for example, a frequency of shocks, an amplitude of shocks, a temperature and/or the like, that may be encountered by the circuit board and/or the corresponding one of the tools 401-403. For example, the board environment recording may record the conditions at predetermined time intervals, such as, for example, every five minutes. The board environment recording may record repairs to the board and/or the corresponding one of the tools 401-403. Thus, the board environment recording may indicate a lifetime history of the circuit board and/or the corresponding one of the tools 401-403. The control application 230, the tools 401-403 and/or the linking tool may determine the time for service based on the board environment recording.

As a further example, the control application 230, the tools 401-403 and/or the linking tool may calculate an equivalent drilling time. The equivalent drilling time may be a value that may estimate the wear of the corresponding one of the tools 401-403. The value may be compared to a threshold to determine if the corresponding one of the tools 401-403 may need service. The value may be, for example, the hours that the corresponding one of the tools 401-403 has been in use multiplied by a variable that may be based on the conditions encountered by the corresponding one of the tools 401-403. For example, if the corresponding one of the tools 401-403 has operated under standard conditions, such as, for example, no shock and/or minimal shock and temperature of twenty-five degrees Celsius, the variable may be one. As a further example, if the corresponding tool has operated under non-standard conditions, such as, for example, relatively excessive shock and temperature exceeding thirty degrees Celsius, the variable may be between two and fifty. Thus, if the value meets or exceeds the threshold, the equivalent drilling time may indicate that the corresponding one of the tools 401-403 may require service and/or the like.

The control application 230, the tools 401-403 and/or the linking tool may calculate a remaining drilling time. The remaining drilling time may be a value that may estimate an amount of time that the corresponding one of the tools 401-403 may be used before service and/or repair. The remaining drilling time may be, for example, the difference between the equivalent drilling time and the threshold, the difference between the equivalent drilling time and an average life of the type of tool, and/or the like. The remaining drilling time may be based on expected conditions that may be encountered by the corresponding one of the tools 401-403. The control application 230 and/or the terminals 211-213 may optimize the drilling operations using the remaining drilling time for one or more of the tools 401-403. For example, the control application 230 and/or the terminals 211-213 may optimize the drilling operations by adjusting the drilling operations to maximize the remaining drilling time for one or more of the tools 401-403.

The time for service, the equivalent drilling time and/or the remaining drilling time may be used by the control application 230 and/or the linking tool to generate and/or transmit a work order. The work order may be, for example, an order for a replacement tool, a request to a technician for maintenance and/or the like. Thus, the work order may be transmitted and/or the time for service may be scheduled if one or more of the tools 401-403 that may require service are in use and/or are located remotely relative to where the service may occur. For example, if the value for equivalent drilling time approaches the threshold, the work order may be transmitted and/or the time for service may be scheduled if the corresponding one of the tools 401-403 may be in use and/or may be located remotely relative to where the service may occur.

The system 400 may employ SOA to standardize the tools 401-403. For example, SOA may be used so that the linking tool may enable the first protocol tools to be programmed, monitored, diagnosed and/or serviced using the second protocol. As a further example, the first protocol may be a proprietary protocol. The tools 401-403 that use the proprietary protocol may connect to the linking tool. Connection of the tools 401-403 that use the proprietary protocol to the linking tool may enable the tools 401-403 that use the proprietary protocol to communicate with the control application 230, the telemetry system 100, the wireless network 420 and/or the first network 200. For example, the tools 401-403 that use the proprietary protocol may transmit the information to the linking tool in a non-standardized format. The linking tool may convert the information from the non-standardized format to a standardized format using the second protocol. The linking tool may transmit the information to the control application 230, the telemetry system 100, the wireless network 420 and/or the first network 200 using the second protocol.

The standardized format and/or the second protocol may be used for any number of the tools 401-403. Thus, the service company performing the drilling operations may program, may monitor, may diagnose and/or may service any number of the tools 401-403 of the service company using the standardized format and/or the second protocol.

For example, the first protocol may be a non-TCP/IP-based protocol, and/or the second protocol may be a TCP/IP-based protocol. TCP/IP-based protocols are the basic communication protocols of the Internet. For example, an Internet browser and/or an Internet server may use a TCP/IP-based protocol to connect to the Internet. The Internet browser may use a TCP/IP-based protocol to access Internet servers, and the Internet servers may use TCP/IP-based protocols to send HyperText Markup Language (HTML) to the Internet browser.

The non-TCP/IP-based protocol may prevent the tools 401-403 that may execute and/or may use the non-TCP/IP-based protocol (hereafter "non-TCP/IP tools") from communication with the control application 230, the telemetry system 100, the wireless network 420 and/or the first network 200. For example, the non-TCP/IP tools may use and/or may execute proprietary protocols.

One or more of the tools 401-403 that may use and/or may execute TCP/IP-based protocols may act as the linking tool. The non-TCP/IP tools may register with and/or connect to the linking tool. Connection of the non-TCP/IP tools to the linking tool may enable the non-TCP/IP tools to communicate with the control application 230, the telemetry system 100, the wireless network 420 and/or the first network 200. For example, the non-TCP/IP tools may transmit the information to the linking tool in a non-TCP/IP format. The linking tool may convert the information from the non-TCP/IP format to a TCP/IP format. The linking tool may transmit the information in the TCP/IP format to the control application 230, the telemetry system 100, the wireless network 420 and/or the first network 200. The non-TCP/IP tools 401-403 may automatically register with and/or may automatically connect to the linking tool.

The linking tool may obtain and/or may convert the information from the non-TCP/IP tools without and/or before communication of the linking tool with the control application 230, the telemetry system 100, the wireless network 420 and/or the first network 200. Thus, the linking tool may decrease a time associated with the registration and/or the connection of the non-TCP/IP tools to the system 400.

For example, the non-TCP/IP tools may transmit the information in the non-TCP/IP format to the linking tool without and/or before communication of the linking tool with the control application 230, the telemetry system 100, the wireless network 420 and/or the first network 200. The linking tool may convert the information to the TCP/IP format without and/or before communication of the linking tool with the control application 230, the telemetry system 100, the wireless network 420 and/or the first network 200. If the linking tool connects to the control application 230, the telemetry system 100, the wireless network 420 and/or the first network 200, the linking tool may transmit the data in the TCP/IP format.

The TCP/IP format may be used for any number of the tools 401-403. Thus, the service company performing the drilling operations may program, may monitor, may diagnose and/or may service any number of the tools 401-403 of the service company using the TCP/IP format.

Figure 3:
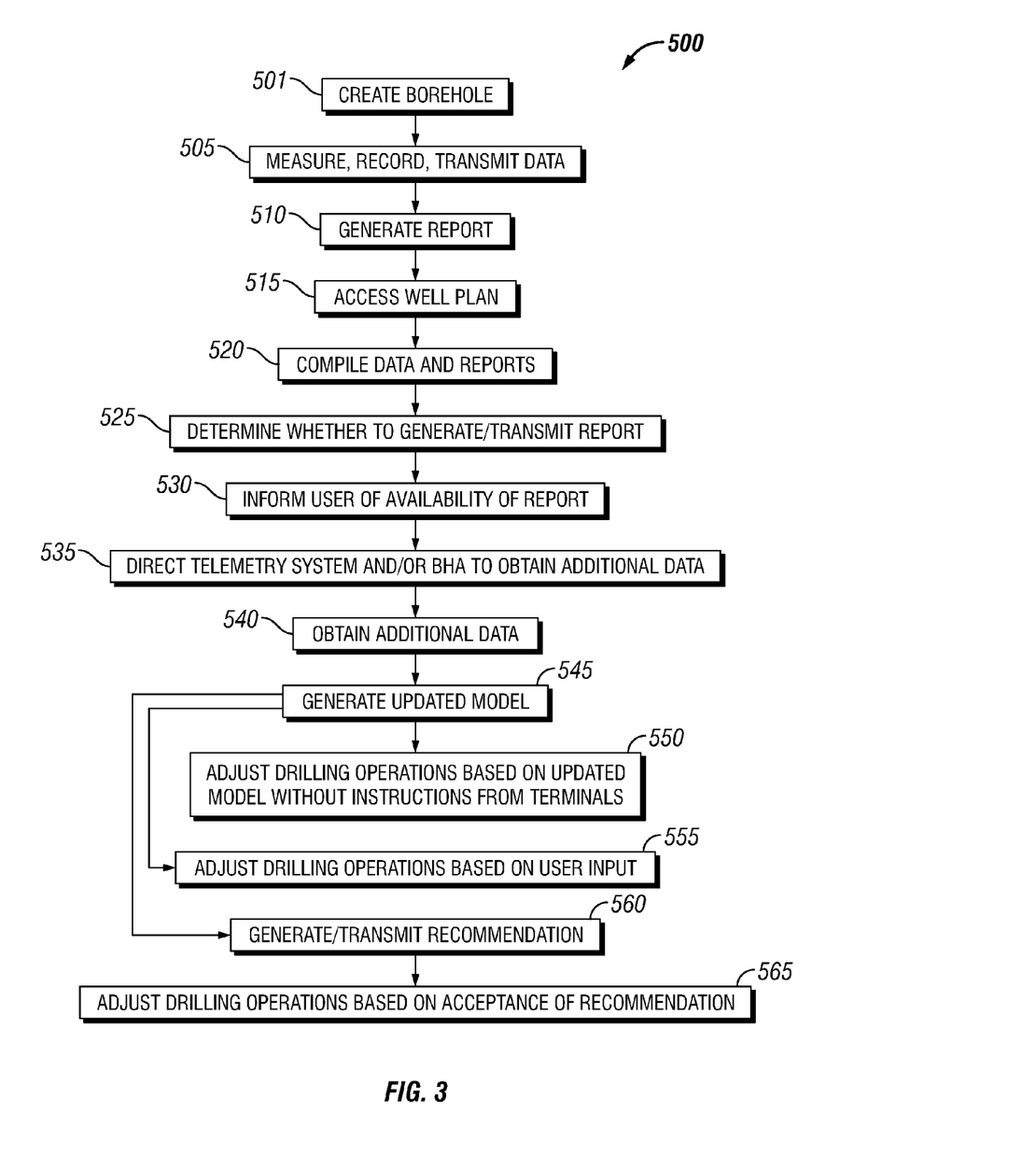
FIG. 3 illustrates a flowchart of a method for managing and/or using data for tools in a wellbore in an embodiment of the present invention.

FIG. 3 generally illustrates a flowchart of a method 500 for obtaining, managing and/or utilizing drilling data using a drill string telemetry system in an embodiment of the present invention. As generally shown at step 501, the drill string 12 may create the borehole 11. As generally shown at step 505, the data acquired from and/or through the borehole 11 may be measured, may be recorded and/or may be transmitted. As generally shown at step 510, the report may be generated based on the data. The data and/or the report may be stored. As generally shown at step 515, the well plan information for the area where drilling operations occur may be accessed. For example, the tool 10 may access the well plan information from the database 229, the control application 230 and/or the first network 200 using the telemetry system 100.

As generally shown at step 520, the data and/or the report may be periodically obtained and/or compiled. As generally shown at step 525, whether to generate and/or to transmit the report and/or the data may be determined. For example, whether to transmit the report and/or the data may be determined without instructions from the first network 200 and/or the terminals 211-213. For example, if one or more of the tools 401-403 associated with the drill string 12 may have a malfunction and/or damage, the report and/or the data may be transmitted. As a further example, if the drilling conditions may have changed, the report and/or the data may be transmitted. As generally shown at step 530, the user may be informed of generation and/or availability of the report, the updated model and/or the data, such as, for example, by an email, a pager message, a text message and/or the like. The control application 230 may provide hyperlinks that connect to the reports, the well plan information, the predicted state of the tool 10, the updated model, the data, the instructions and/or the observations.

As generally shown at step 535, the control application 230 may be directed to obtain additional data. As generally shown at step 540, the additional data may be recorded and/or may be obtained. As generally shown at step 545, the additional data may be transmitted to the database 229 and/or the terminals 211-213. For example, the additional data may be transmitted using the telemetry system 100. The additional data may be displayed and/or may be stored.

As generally shown at step 545, if the drilling conditions may have changed, an updated model may be calculated, may be generated and/or may be transmitted. As generally shown at step 550, the drilling operations may be adjusted based on the updated model. For example, the drilling operations may be adjusted without instructions from the first network 200 and/or the terminals 211-213. The control application 230 may be designed and/or may be programmed to accept user input from the terminals 211-213. As generally shown at step 555, the drilling operations of the drill string 12 may be adjusted based on the user input.

As generally shown at step 560, the recommendation may be generated and/or may be transmitted. For example, the recommendation may be generated and/or may be transmitted if the drilling conditions may have changed. The user and/or the service company may be informed of generation and/or availability of the recommendation, such as, for example, by an email, a pager message, a text message and/or the like. In an embodiment, the recommendation may be transmitted to the remote diagnostic system. The user and/or the service company may accept the recommendation using the control application 230 and/or the terminals 211-213. As generally shown at step 565, the drilling operations may be adjusted based on acceptance of the recommendation.

Figure 4:
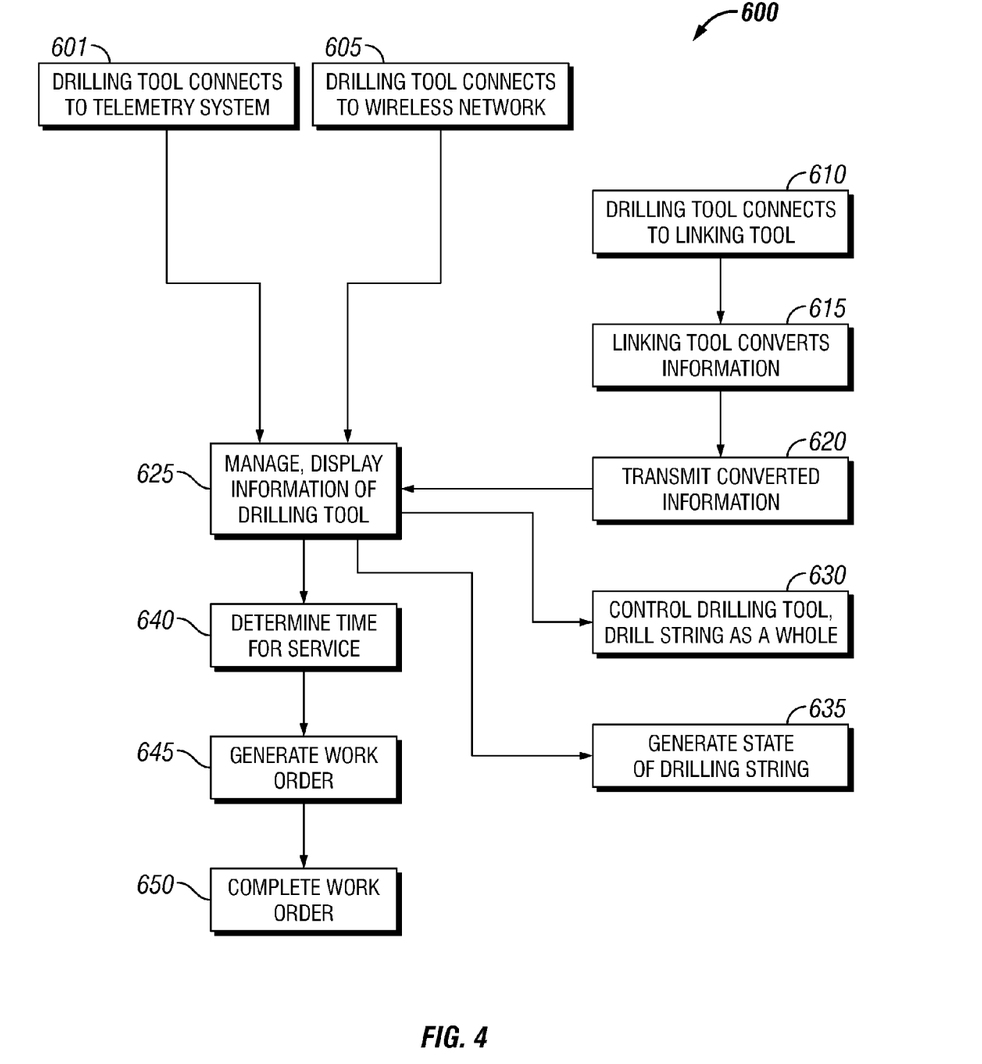
FIG. 4 illustrates a flowchart of a method for managing and/or using data for tools in a wellbore in an embodiment of the present invention.

FIG. 4 generally illustrates a flowchart of a method 600 for obtaining, managing and/or utilizing drilling data using a drill string telemetry system in an embodiment of the present invention. As generally shown at step 601, the first tool 401 may connect to the first network 200 using the telemetry system 100. Alternatively, as generally shown at step 605, the first tool 401 may connect to the first network 200 using the wireless network 420. The first tool 401 may connect to the first network 200 using both the telemetry system 100 and the wireless network 420. The first tool may automatically register with and/or may automatically connect to the first network 200 without input by the first network 200 and/or the terminals 211-213.

As generally shown at step 610, the first tool 401 may register with and/or connect to the linking tool. For example, the first tool 401 may use the first protocol and/or may be a non-TCP/IP tool. The linking tool may obtain the information from the first tool 401 in the first protocol and/or a non-TCP/IP format. As generally shown at step 615, the linking tool may convert the information from the first protocol to the second protocol. For example, the linking tool may convert the information from the non-TCP/IP format to the TCP/IP format.

As generally shown at step 620, if the linking tool is connected to the control application 230, the linking tool may transmit the information to the control application 230 using the second protocol. For example, the linking tool may use the second protocol to transmit the information to the control application 230 using the telemetry system 100, the wireless network 420 and/or the first network 200. The linking tool may transmit the information in the TCP/IP format, for example.

If the linking tool is not connected to the control application 230 and/or the first network 200, the linking tool may transmit the information to the control application 230 and/or the first network using the second protocol if and/or when the linking tool is connected to the control application 230 and/or the first network 200, respectively. For example, if the linking tool is not connected to the first network 200, the linking tool may transmit the information in the TCP/IP format to the control application 230 if and/or when the linking tool is connected to the first network 200. If the linking tool is connected to the control application 230, the telemetry system 100, the wireless network 420 and/or the first network 200, first tool 401 may be connected to the control application 230, the telemetry, system 100, the wireless network 420 and/or the first network 200, respectively.

As generally shown at step 625, connection of the first tool 401 to the application 230 may enable the control application 230 to manage and/or display the information for the first tool 401. The connection of the first tool 401 to the application 230 may enable the control application 230 to manage and/or display the information for the first tool 401 using the graphic user interface of the control application 230. As generally shown at step 630, the control application 230 may control the first tool 401 and/or any other component of the drill string 12. For example, the control application 230 may program, control and/or optimize the first tool 401 and/or any other component of the drill string 12. As generally shown at step 635, the control application 230 may determine, may generate and/or may transmit a state of any component of the drill string 12.

As generally shown at step 640, a time for service of the first tool 401 may be determined. The service may be, for example, tool maintenance, tool repair, tool replacement and/or the like. As generally shown at step 645, the time for service may be used to generate and/or transmit the work order. The work order may be, for example, an order for a replacement tool, a request to a technician for maintenance and/or the like. The first tool 401 may calculate and/or may indicate the equivalent drilling time and/or the remaining drilling time so that the technician may determine whether to remove the first tool 401 from the borehole 11 and/or whether to service the first tool 401. The remaining drilling time may be, for example, the difference between the equivalent drilling time and the threshold, the difference between the equivalent drilling time and an average life of the type of tool, and/or the like. As generally shown at step 650, the work order may be completed if the first tool 401 completed involvement in the drilling operations, was removed from the borehole 11 and/or was transported to a surface location for maintenance.

Thus, the drilling system 1, the system 400, the method 500 and/or the method 600 may enable a world-wide system of tools automatically registered and/or automatically connected to the first network 200 to be monitored by, communicated with and/or controlled by the application 230. Moreover, the tools 401-403 may optimize tool performance and/or may adjust the drilling operations without input from the first network 200 and/or the terminals 211-213 that may be connected to the first network 200.

It should be understood that various changes and modifications to the presently preferred embodiments described herein will be apparent to those having ordinary skill in the art. Such changes and modifications may be made without departing from the spirit and scope of the present invention and without diminishing its attendant advantages. It is, therefore, intended that such changes and modifications be covered by the appended claims.

We claim:

1. A method for managing data using a first network, the method comprising:
   connecting a plurality of tools to a drill string;
   transmitting the data from at least one of the tools to a linking tool in communication with the plurality of tools wherein the linking tool is positioned within the drill string and further wherein the linking tool converts a first protocol associated with the data to a second protocol associated with the network;
   transmitting the data from the linking tool to the first network; and
   communicating with the plurality of tools using wired drill pipe wherein the wired drill pipe is connected to the first network and further wherein the wired drill pipe has a plurality of wired drill pipe joints connected to each other further wherein the linking tool uses the wired drill pipe to transmit the data from a plurality of linking tools to the first network.

2. The method of claim 1 further comprising:
providing a terminal remote from the drill string and in communication with the network; and
controlling a function of at least one of the plurality of tools using the terminal wherein the terminal controls the function using instructions transmitted to the linking tool.

3. The method of claim 1 further comprising:
displaying the data using a web browser provided by a terminal connected to the first network.

4. The method of claim 1 further comprising:
controlling at least one of the plurality of tools using a terminal remote from the drill string and in communication with the first network wherein the terminal transmits instructions in the second protocol to the tool in the first protocol and further wherein the first protocol is in non-TCP/IP format and the second protocol is in TCP/IP format.

5. The method of claim 1 further comprising:
transmitting the data from the linking tool to the first network using a second network wherein the second network is a wireless network.

\* \* \* \* \*